US012444281B2

(12) United States Patent
Carlson et al.

(10) Patent No.: US 12,444,281 B2
(45) Date of Patent: *Oct. 14, 2025

(54) METHOD OF INSTALLING A SECURITY ALARM SYSTEM AND WIRELESS ACCESS POINT

(71) Applicant: 1010210 B.C. Ltd., Surrey (CA)

(72) Inventors: Julian Paul Carlson, Surrey (CA); Paul Justin Carlson, Surrey (CA)

(73) Assignee: 1010210 B.C. Ltd., Surrey (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/738,366

(22) Filed: Jun. 10, 2024

(65) Prior Publication Data

US 2024/0331514 A1 Oct. 3, 2024

Related U.S. Application Data

(60) Continuation of application No. 18/337,994, filed on Jun. 20, 2023, which is a division of application No.

(Continued)

(51) Int. Cl.

*G08B 19/00* (2006.01)
*G08B 13/14* (2006.01)

(Continued)

(52) U.S. Cl.

CPC ... *G08B 13/1436* (2013.01); *G08B 13/19697* (2013.01); *G08B 19/005* (2013.01);

(Continued)

(58) Field of Classification Search

CPC .......... G08B 13/1436; G08B 13/19697; G08B 19/005; G08B 29/06; G08B 29/16; G08B 25/10; G08B 13/19619; G08B 17/10

See application file for complete search history.

(56) References Cited

U.S. PATENT DOCUMENTS 3,986,183 A 10/1976 Fujiwara
4,296,410 A 10/1981 Higgs et al.

(Continued)

FOREIGN PATENT DOCUMENTS

CA 3100201 A1 11/2019
CN 1787024 A 6/2006

(Continued)

OTHER PUBLICATIONS

Vision Security: "Installation & Operation Manual ZD 2012", published Feb. 10, 2011.

(Continued)

*Primary Examiner* — Nay Tun

(74) *Attorney, Agent, or Firm* — Nicholas Garner; Oyen Wiggs Green & Mutala LLP

(57) ABSTRACT

There is provided a method of installing a wireless access point so as to inhibit detection thereof within the interior of a home. The method includes disconnecting one of a doorbell chime, a smoke detector or a carbon monoxide detector of a building from existing wiring thereof. The one of the doorbell chime, smoke detector or carbon monoxide detector is in an existing location of the home which is central and elevated. The method includes removing the doorbell chime from the existing location. The method includes installing in the existing location the wireless access point. The method includes connecting the existing wiring to the wireless access point so as to receive power therefrom.

23 Claims, 7 Drawing Sheets

Related U.S. Application Data

17/343,572, filed on Jun. 9, 2021, now Pat. No. 11,749,077, which is a continuation of application No. PCT/CA2019/051771, filed on Dec. 9, 2019.

(60) Provisional application No. 62/777,695, filed on Dec. 10, 2018.

(51) Int. Cl.
*G08B 13/196* (2006.01)
*G08B 29/06* (2006.01)
*G08B 29/16* (2006.01)
*G08B 25/10* (2006.01)

(52) U.S. Cl.
CPC ............. *G08B 29/06* (2013.01); *G08B 29/16* (2013.01); *G08B 25/10* (2013.01)

(56) References Cited

U.S. PATENT DOCUMENTS 4,954,812 A 9/1990 Lebron
5,164,705 A 11/1992 Dunagan et al.
D354,925 S 1/1995 Eggers et al.
5,434,500 A 7/1995 Hauck et al.
D383,078 S 9/1997 Carmi
5,714,932 A 2/1998 Castellon et al.
5,784,446 A * 7/1998 Stuart .................. H04M 11/025 379/159
5,905,787 A * 5/1999 Stuart .................. H04M 11/025 379/167.05
D417,165 S 11/1999 Takeda et al.
6,057,764 A 5/2000 Williams
D429,696 S 8/2000 Taylor
D434,387 S 11/2000 Taylor
6,185,294 B1 * 2/2001 Chornenky .......... H04M 11/025 379/350
6,400,267 B1 6/2002 Gordon-Levitt et al.
6,519,208 B2 * 2/2003 DeVries ................. G04G 15/00 368/10
6,577,238 B1 6/2003 Whitesmith et al.
6,940,016 B1 * 9/2005 Cornett ................... H01F 27/06 439/535
7,023,327 B1 * 4/2006 Chen ........................ G08B 3/10 340/392.5
7,079,034 B2 7/2006 Stilp
7,135,959 B2 11/2006 Wagner et al.
7,215,088 B1 * 5/2007 Clark ..................... H05B 47/18 315/312
7,221,230 B2 5/2007 Partridge et al.
D561,058 S 2/2008 Taylor
7,417,535 B2 8/2008 Mathews et al.
7,600,694 B2 * 10/2009 Helt ......................... F24F 11/88 236/51
7,785,138 B2 * 8/2010 Bonnassieux ......... H04W 84/22 439/535
8,410,937 B2 4/2013 Collins
8,442,797 B2 5/2013 Kim et al.
8,504,103 B2 * 8/2013 Ficquette ......... G08B 13/19658 340/541
8,638,210 B2 * 1/2014 Simon .................... G08B 29/16 340/521
D708,976 S 7/2014 Moeller
8,773,263 B2 7/2014 Thibault
D713,277 S 9/2014 Hasegawa et al.
8,933,789 B1 1/2015 Fink et al.
9,060,104 B2 6/2015 Scalisi
9,113,051 B1 * 8/2015 Scalisi ................... H04N 7/188
9,179,108 B1 11/2015 Scalisi et al.
D744,883 S 12/2015 Roberts et al.
9,202,359 B2 * 12/2015 Rauworth .............. G08B 17/10
9,245,439 B2 1/2016 Lamb et al.
D764,335 S 8/2016 Thornton et al.
D778,184 S 2/2017 Kikstra et al.
D782,349 S 3/2017 Konotopskyi et al.
9,589,446 B1 3/2017 Dey et al.
D783,542 S 4/2017 Marsden
9,639,100 B2 * 5/2017 Storm ...................... F24F 11/66
9,659,470 B2 5/2017 Smith
D788,610 S 6/2017 Venth et al.
D788,625 S 6/2017 Hsieh et al.
9,695,015 B1 7/2017 Marinelli
D796,975 S 9/2017 Jou et al.
9,767,660 B1 9/2017 Skarda
9,799,182 B1 10/2017 Modi et al.
9,905,099 B2 2/2018 Carlson et al.
9,927,301 B2 3/2018 Peterson
9,959,745 B2 5/2018 Lamb et al.
D826,941 S 8/2018 Zhou et al.
10,062,533 B2 * 8/2018 Qureshi ................. H01H 49/00
10,070,058 B2 * 9/2018 Siminoff ................ H04N 7/186
10,072,985 B2 9/2018 Peterson
D841,504 S 2/2019 Alvarado et al.
10,210,356 B2 * 2/2019 Vechvittayakhlung ...................... G06K 7/10366
10,249,161 B2 4/2019 Carlson
D848,293 S 5/2019 Laurans et al.
10,290,447 B2 * 5/2019 Qureshi ................. H04N 7/188
D852,071 S 6/2019 Laurans et al.
D852,074 S 6/2019 Laurans et al.
10,319,213 B1 * 6/2019 Conner .................. G01K 3/005
10,600,293 B2 3/2020 McClintock
10,622,770 B2 * 4/2020 Parks ...................... H04W 4/38
D892,659 S 8/2020 Carlson et al.
11,100,786 B2 8/2021 Dey et al.
11,295,584 B2 4/2022 Carlson et al.
11,341,829 B2 5/2022 Carlson et al.
11,557,184 B2 1/2023 Fisher
11,645,897 B2 5/2023 Carlson et al.
11,657,687 B2 5/2023 Thibault
11,749,077 B2 9/2023 Carlson et al.
11,783,655 B1 10/2023 Else et al.
2001/0030605 A1 10/2001 Novotny
2002/0086567 A1 * 7/2002 Cash, Jr. .............. H01R 25/006 439/106
2004/0085205 A1 5/2004 Yeh
2004/0095254 A1 * 5/2004 Maruszczak ............. G08B 3/10 340/692
2004/0121648 A1 * 6/2004 Voros ................. H01R 13/6215 439/535
2004/0178889 A1 * 9/2004 Buckingham ....... H04L 12/2816 700/291
2004/0182096 A1 * 9/2004 Alles ..................... F24F 3/0442 62/186
2004/0260407 A1 * 12/2004 Wimsatt ................ H04L 12/282 700/20
2005/0024207 A1 2/2005 Schebel et al.
2005/0096587 A1 5/2005 Santini, Jr. et al.
2005/0125083 A1 * 6/2005 Kiko ..................... H04L 12/282 700/20
2005/0152323 A1 * 7/2005 Bonnassieux ...... C07D 207/337 370/338
2005/0161517 A1 * 7/2005 Helt ......................... F24F 11/30 236/1 C
2005/0179545 A1 8/2005 Bergman et al.
2005/0248443 A1 * 11/2005 Steinetz ................... G08B 3/10 340/392.1
2006/0071762 A1 * 4/2006 Lombardo ............... G08B 3/10 340/330
2007/0052531 A1 * 3/2007 Mathews ............... H04B 3/546 340/533
2007/0279226 A1 12/2007 Whitesmith et al.
2008/0290864 A1 11/2008 Latraverse
2008/0297339 A1 * 12/2008 Mathews ................ H04L 12/10 340/538.16
2009/0042604 A1 * 2/2009 Ficquette ............. G08B 25/001 455/556.1
2009/0201160 A1 * 8/2009 Acrey ........................ E06B 7/32 340/573.3
2009/0201209 A1 8/2009 Boyle
2010/0102907 A1 4/2010 Schebel et al.

(56) References Cited

U.S. PATENT DOCUMENTS

2010/0308990 A1* 12/2010 Simon .................... G08B 25/10 340/506
2011/0004916 A1 1/2011 Schiffman et al.
2011/0057788 A1 3/2011 Talkington et al.
2011/0106996 A1* 5/2011 Rosso ................... G06F 13/409 710/110
2011/0156905 A1 6/2011 Collins
2012/0002655 A1* 1/2012 Bonnassieux ......... H04W 84/22 370/338
2012/0089299 A1 4/2012 Breed
2012/0293310 A1 11/2012 Fitzgibbon et al.
2013/0009771 A1* 1/2013 Simon .................... G08B 29/16 340/539.1
2013/0057404 A1 3/2013 Thibault
2013/0057405 A1 3/2013 Seelman et al.
2013/0079931 A1* 3/2013 Wanchoo .......... H02J 13/00004 700/278
2013/0170532 A1 7/2013 Marozsak et al.
2013/0257611 A1 10/2013 Lamb et al.
2013/0316583 A1 11/2013 Scherer et al.
2014/0070922 A1* 3/2014 Davis ................... H04M 11/025 340/6.1
2014/0097953 A1* 4/2014 Jelveh .................... G08B 25/14 340/517
2014/0244047 A1* 8/2014 Oh .......................... F24F 11/52 709/204
2014/0265633 A1* 9/2014 O'Brien ................. G08B 13/19 307/116
2014/0266669 A1 9/2014 Fadell et al.
2014/0267716 A1* 9/2014 Child ..................... H04N 7/186 348/143
2014/0327526 A1 11/2014 Bess et al.
2014/0340222 A1 11/2014 Thornton et al.
2015/0199888 A1 7/2015 Shapira et al.
2015/0256665 A1* 9/2015 Pera .................... H04L 12/2816 455/420
2015/0348385 A1 12/2015 Lamb et al.
2015/0381227 A1* 12/2015 Browning ............... H04W 4/70 455/73
2016/0044447 A1* 2/2016 Tetreault .............. H01R 31/065 439/620.21
2016/0111878 A1* 4/2016 Qureshi ................. H01R 24/30 29/622
2016/0300468 A1* 10/2016 Stricker ................. G08B 21/02
2017/0084131 A1* 3/2017 Harrison .................. G08B 3/10
2017/0109984 A1* 4/2017 Child ..................... H04N 23/74
2017/0195625 A1* 7/2017 Mahar .................... H04N 7/147
2017/0236402 A1* 8/2017 McGee .................. G08B 17/00 340/628
2017/0243456 A1 8/2017 Smith
2018/0025190 A1* 1/2018 Vechvittayakhlung ...................... G06K 7/10009 340/10.1
2018/0137727 A1* 5/2018 Barth ............... G08B 13/19658
2018/0365943 A1 12/2018 DiPoala
2019/0027875 A1* 1/2019 Parks .................. H02J 13/0005
2019/0096202 A1* 3/2019 Seelman ............ G08B 21/0415
2020/0357253 A1 11/2020 Carlson et al.
2021/0209907 A1 7/2021 Carlson et al.
2021/0272431 A1 9/2021 Chavady
2021/0327230 A1 10/2021 Wang et al.

FOREIGN PATENT DOCUMENTS

CN 201780643 U 3/2011
DE 20017433 U1 3/2001
DE 202014000574 U1 2/2014
DE 102013217366 A1 11/2014
EP 1860624 A1 11/2007
GB 2356077 A 5/2001
GB 2461815 B 7/2011
NL 1000644 C2 12/1996
WO 2003046855 A1 6/2003
WO 2016011564 A1 1/2016
WO 20180011754 A1 1/2018
WO 2019218050 A1 11/2019

OTHER PUBLICATIONS

WIPO, International Searching Authority, International Search Report dated Nov. 5, 2015 in International Patent Application No. PCT/CA2015/050711.
European Search Report completed Feb. 1, 2018 for EP 15 82 4924.
Wipo, International Searching Authority, International Search Report dated Jul. 23, 2019 in International Patent Application No. PCT/CA2019/000071.
Extended Supplementary European Search Report dated May 14, 2021 for European Patent Application No. EP 19 80 3339.
WIPO, International Searching Authority, International Search Report dated Aug. 9, 2021 in International Patent Application No. PCT/CA2020/051582.
"ISC West 2019" available Apr. 17, 2019, [online], [site visited Jan. 2, 2020]. Retrieved from Internet, URL: https://www.youtube.com/watch?v=U20ki9sfQAE (Year: 2019).
"AIS25BATR" from Digikey, https://www.digikey.com/en/products/detail/stmicroelectronics/AIS25BATR/16669231 archived page dated Aug. 27, 2022.
"AIS25BA: ultralow noise, wide bandwidth, 3-axis accelerometer with TDM interface for automotive applications", datasheet, dated Jul. 18, 2022.
"MMC5603NJ" from Memsic, https://www.memsic.com/magnetometer-2, archived page dated Oct. 2, 2022.
"MMC5603NJ:±30 Gauss, Monolithic, High Performance, Low Cost 3-axis Magnetic Sensor", datasheet, dated Jan. 17, 2022.
Resideo, "5870API-WH—Wireless Indoor Asset Protection Sensor, White", https://www.resideo.com/us/en/pro/products/security/proseries/security-and-safety/asset-protection/5870api-wh-wireless-indoor-asset-protection-sensor-white-5870api-wh/, archived article dated Dec. 21, 2021.
"5870API Wireless Indoor Asset Protection", Honeywell Home, dated 2019.
Extended European search report dated Dec. 11, 2023 for European Patent Application No. 20961779.4.
International Search Report for International Patent Cooperation Treaty Patent Application No. PCT/CA2025/050475, completed on Jul. 18, 2025 and mailed Aug. 6, 2025.

* cited by examiner

METHOD OF INSTALLING A SECURITY ALARM SYSTEM AND WIRELESS ACCESS POINT

BACKGROUND OF THE INVENTION

Field of the Invention

The present invention relates to a method of installing a wireless access point and, in particular, to a method of installing a wireless access point wherein one of a doorbell chime, a smoke detector, a carbon monoxide detector and a thermostat is replaced with the wireless access point. There is also provided a method of converting a wired doorbell assembly into a wireless access point.

Description of the Related Art

U.S. Pat. No. 7,135,959 which issued on Nov. 14, 2006, to Wagner et al. discloses an apparatus and method for wireless doorbell and security control panel interaction. The system includes a wireless doorbell, a security control panel, and at least one control panel activation device having a transmitter and a manually activated switch or button. The control panel is in communication with the at least one control panel activation device by way of the transmitter. The control panel includes a receiver for receiving signals transmitted from the at least one control panel activation device via the transmitter. A security keypad having a speaker device for broadcasting an alarm or message related to functions of the security system is in communication with the control panel as well. At least one auxiliary security device is also in communication with the control panel. The auxiliary security device may include an assortment of devices that perform ancillary functions that enhance the functionality of the security control panel.

United States Patent Application Publication No. 2014/0070922 to Davis discloses a system, apparatus, and method specially adapted to replace conventional doorbell systems in environments having access to wireless networks connected to the Internet, which provides wireless communication between the doorbell button unit and mobile devices without requiring additional or different power sources or wiring, aside from pre-existing, conventional doorbell wiring.

SUMMARY OF THE INVENTION

There is accordingly provided a method of converting one of a doorbell chime, a smoke detector, a carbon monoxide detector and a thermostat in an existing location of a building to a wireless access point. The method includes disconnecting the one of the doorbell chime, the smoke detector, the carbon monoxide detector and the thermostat from existing wiring thereof. The method includes removing from the existing location the one of the doorbell chime, the smoke detector, the carbon monoxide detector and the thermostat. The method includes installing in the existing location the wireless access point. The method includes connecting the wireless access point to the existing wiring so as to receive power therefrom.

There is also provided a method of installing a wireless access point in a building having at least one of a doorbell chime, a smoke detector, a carbon monoxide detector, and a thermostat. The method includes replacing the at least one of the doorbell chime, the smoke detector, the carbon monoxide detector, and the thermostat with the wireless access point.

There is additionally provided a method of installing a wireless access point so as to inhibit detection thereof within the interior of a home. The method includes disconnecting one of a doorbell chime, a smoke detector and a carbon monoxide detector of a building from existing wiring thereof. The doorbell chime, the smoke detector and the carbon monoxide detector are in central and elevated locations of the home. The method includes removing from one or more existing locations thereof the one or more said doorbell chime, said smoke detector and said carbon monoxide detector. The method includes installing in said one or more existing locations the wireless access point. The method includes connecting said existing wiring to said wireless access point so as to receive power therefrom. The method includes providing the wireless access point with backup power in the form of a battery. The method includes operatively connecting a plurality of door sensors, a plurality of window sensors and one or more motion detectors to the wireless access point.

BRIEF DESCRIPTIONS OF DRAWINGS

The invention will be more readily understood from the following description of the embodiments thereof given, by way of example only, with reference to the accompanying drawings, in which.

DESCRIPTIONS OF THE PREFERRED EMBODIMENTS

Figure 1:
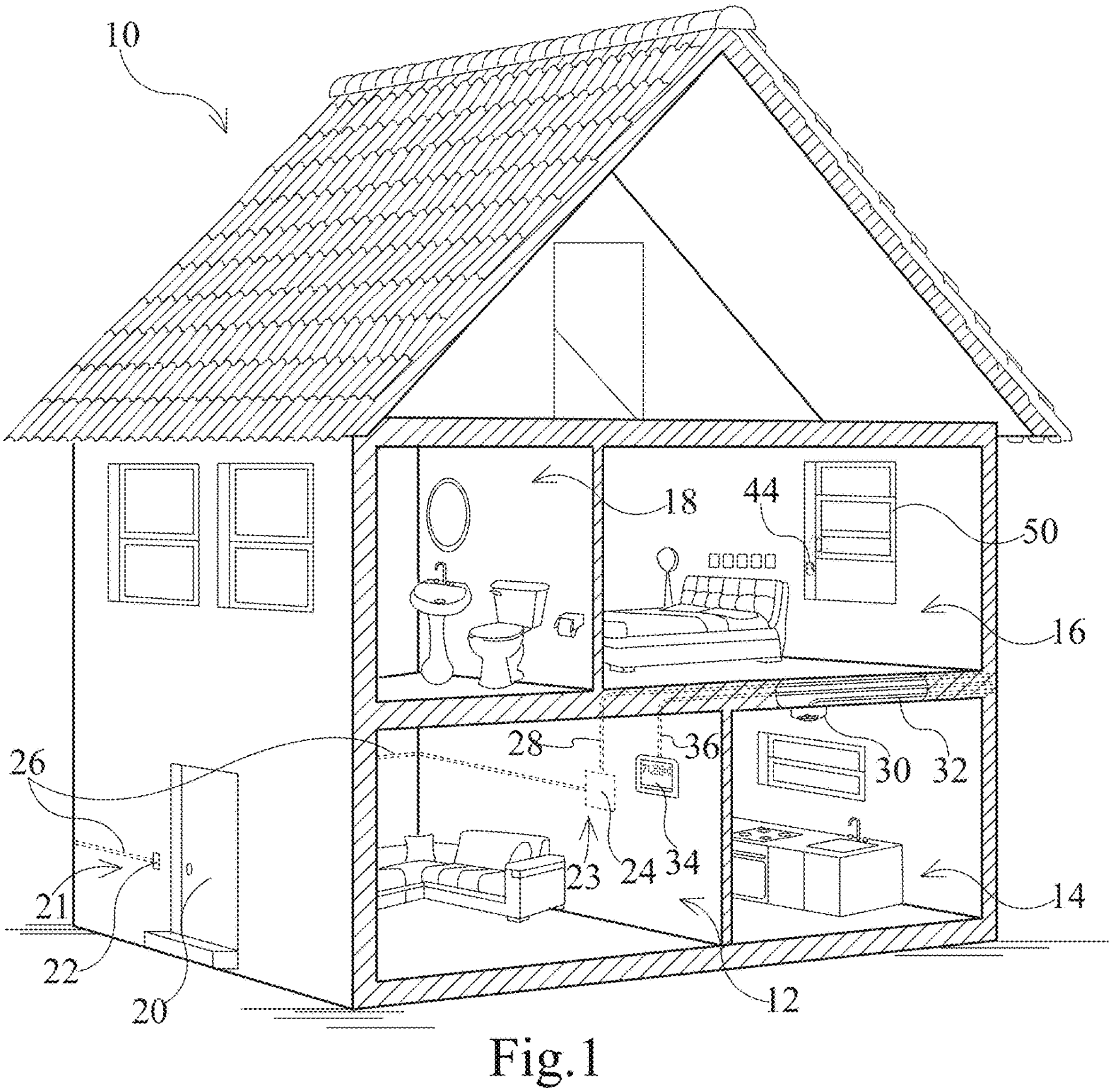
FIG. 1 is a perspective, partially exploded view of a house without a security alarm system.

FIG. 1 shows a building which, in this example, is a house 10 having a living room 12, a kitchen 14, a bedroom 16, and a bathroom 18. The house 10 also has a front door 20 and a wired doorbell assembly 21. The doorbell assembly includes a doorbell actuator or button 22 adjacent to the front door 20. The doorbell assembly 21 includes a doorbell chime 24 wired to the doorbell button 22. The doorbell chime 24 is also wired for power by wiring 28. The doorbell button 22 and the doorbell chime are generally conventional. The house also has a smoke and/or carbon dioxide detector 30 which is wired for power by wiring 32 as well as a thermostat 34 which is wired for power by a wiring 36. The smoke and/or carbon dioxide detector 30 and thermostat are generally conventional.

Figure 2:
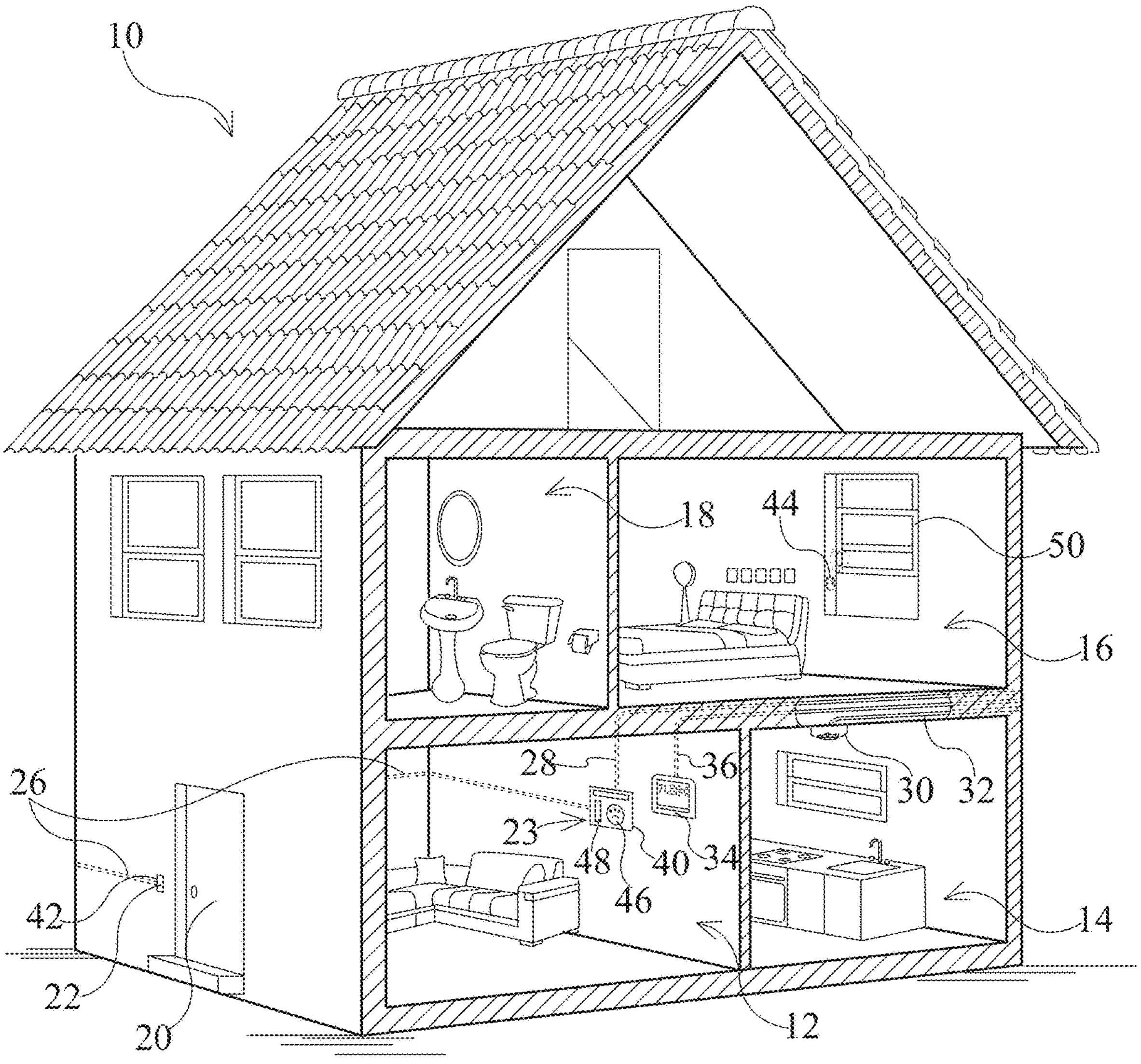
FIG. 2 is a perspective, partially exploded view of the house of FIG. 1 provided with a security alarm system installed according to a first method.

A security alarm system may be installed in the house 10 according to a first method, as shown in FIG. 2. The security alarm system generally comprises a security alarm or control panel 40, a doorbell camera 42, and a plurality of sensors, for example, proximity sensor 44. The doorbell camera is a video camera in this example. The doorbell chime 24, shown in FIG. 1, is replaced with the security control panel 40 when the security system is installed. This replacement is desirable because a doorbell chime is typically in an existing, centralized location 23 in the house 10 which is a suitable for a wireless receiver/transmitter. As seen in FIG. 1, the existing location is an elevated location. Furthermore, the existing wiring 28 which was previously used to power the doorbell chime 24, as shown in FIG. 1, may be used to power the security control panel 40, as shown in FIG. 2. The security control panel 40 may also be provided with a battery 46 to provide backup power to at least one of the security alarm system and the doorbell camera 42, and to protect the at least one of the security alarm system and the doorbell camera from power outages.

The security control panel 40 is wired to the doorbell button 22 and the doorbell camera 42 by the existing wiring 26 which was previously used to wire the doorbell chime 24, as shown in FIG. 1, to the doorbell button 22. Referring back to FIG. 2, the security control panel 40 includes a speaker 48 which broadcasts a chime when the doorbell button 22 is rung. The speaker can also broadcast an alarm or other message related to the functionality of the security alarm system. The security control panel 40 may further communicate wirelessly with a handheld device to remotely provide a homeowner with information regarding the status of the security alarm system.

There is also a plurality of sensors as shown, for example, by proximity sensor 44 which functions as a window sensor for a window 50 in the security alarm system. The proximity sensor 44 may be similar to the type disclosed in U.S. Pat. No. 9,905,099 which issued on Feb. 27, 2018, to Carlson et al. and the full disclosure of which is incorporated herein by reference. In this example, the proximity sensor 44 communicates wirelessly with the security control panel 40. However, in other examples, the proximity sensor may be wired to the security control panel 40. It will be understood by a person skilled in the art that the security alarm system may further include additional proximity sensors, which respectively function as window sensors or doors sensors, as well as motion sensors which sense movement in the house 10.

Figure 3:
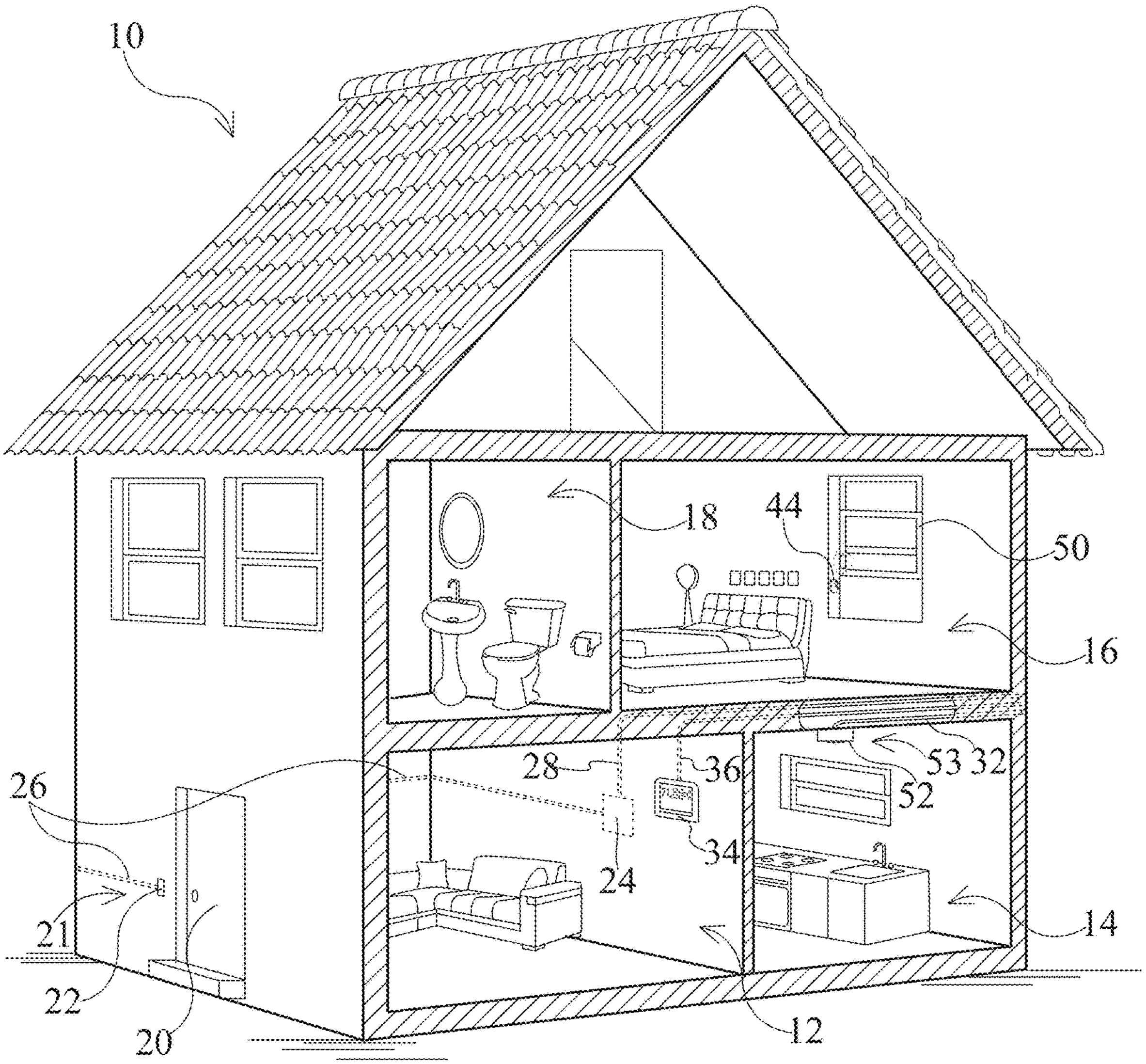
FIG. 3 is a perspective, partially exploded view of the house of FIG. 1 provided with a security alarm system installed according to a second method.

A security alarm system may also be installed in the house 10 according to a second method as shown in FIG. 3. The security alarm system generally comprises a security control panel 52 and a plurality of sensors as shown, for example, by proximity sensor 44. The smoke detector 30, shown in FIG. 1, is replaced with the security control panel 52 when the security system is installed. This replacement is desirable because a smoke detector is typically in an existing, centralized location 53 in the house 10 which is a suitable for a wireless receiver/transmitter. Furthermore, the existing wiring 32 which was previously used to power the smoke detector 30, as shown in FIG. 1, may be used to power the security control panel 52. The security control panel 52 may also be provided with a battery (not shown) to provide backup power. The security control panel 52 may further be provided with a speaker (not shown) which can broadcast an alarm or other message related to the functionality of the security alarm system. The security control panel 52 may additionally communicate wirelessly with a handheld device to remotely provide a homeowner with information regarding the status of the security alarm system.

In this example, the proximity sensor 44 communicates wirelessly with the security control panel 52. However, in other examples, the proximity sensor may be wired to the security control panel 52. It will be understood by a person skilled in the art that the security alarm system may further include additional proximity sensors, which respectively function as window sensors or doors sensors, as well as motion sensors which sense movement in the house 10.

Figure 4:
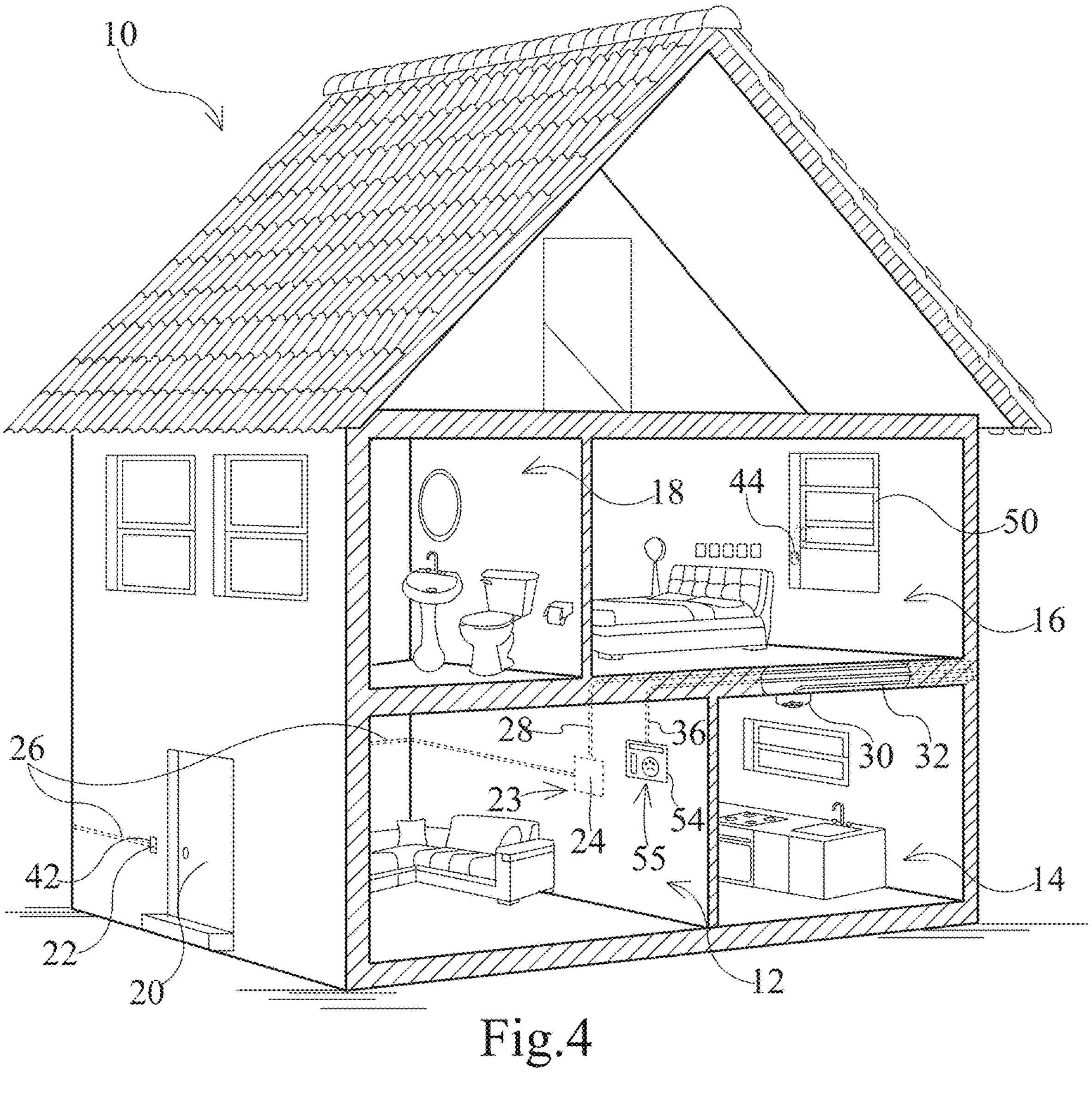
FIG. 4 is a perspective, partially exploded view of the house of FIG. 1 provided with a security alarm system installed according to a third method.

A security alarm system may further be installed in the house 10 according to a third method as shown in FIG. 4. The security alarm system generally comprises a security control panel 54 and a plurality of sensors as shown, for example, by proximity sensor 44. The thermostat 34, shown in FIG. 1, is replaced with the security control panel 54 when the security system is installed. This replacement is desirable because a thermostat is typically in an existing, centralized location 55 in the house 10 which is a suitable for a wireless receiver/transmitter. Furthermore, the existing wiring 36 which was previously used to power the thermostat 34, as shown in FIG. 1, may be used to power the security control panel 54. The security control panel may also be provided with a battery (not shown) to provide backup power. The security control panel 54 may further be provided with a speaker (not shown) which can broadcast an alarm or other message related to the functionality of the security alarm system. The security control panel may additionally also communicate wirelessly with a handheld device to remotely provide a homeowner with information regarding the status of the security alarm system.

In this example, the proximity sensor 44 communicates wirelessly with the security control panel 54. However, in other examples, the proximity sensor may be wired to the security control panel. It will be understood by a person skilled in the art that the security alarm system may further include additional proximity sensors, which respectively function as window sensors or doors sensors, as well as motion sensors which sense movement in the house 10.

It will be understood by a person skilled in the art that in the examples disclosed herein a doorbell chime or smoke and/or carbon monoxide detector or thermostat are replaced with a security control panel. However, in other examples the doorbell chime, smoke and/or carbon monoxide detector and/or thermostat may be replaced with another component or peripheral of a security alarm system such as a motion detector, wireless receiver/transmitter, or signal repeater.

Figure 5:
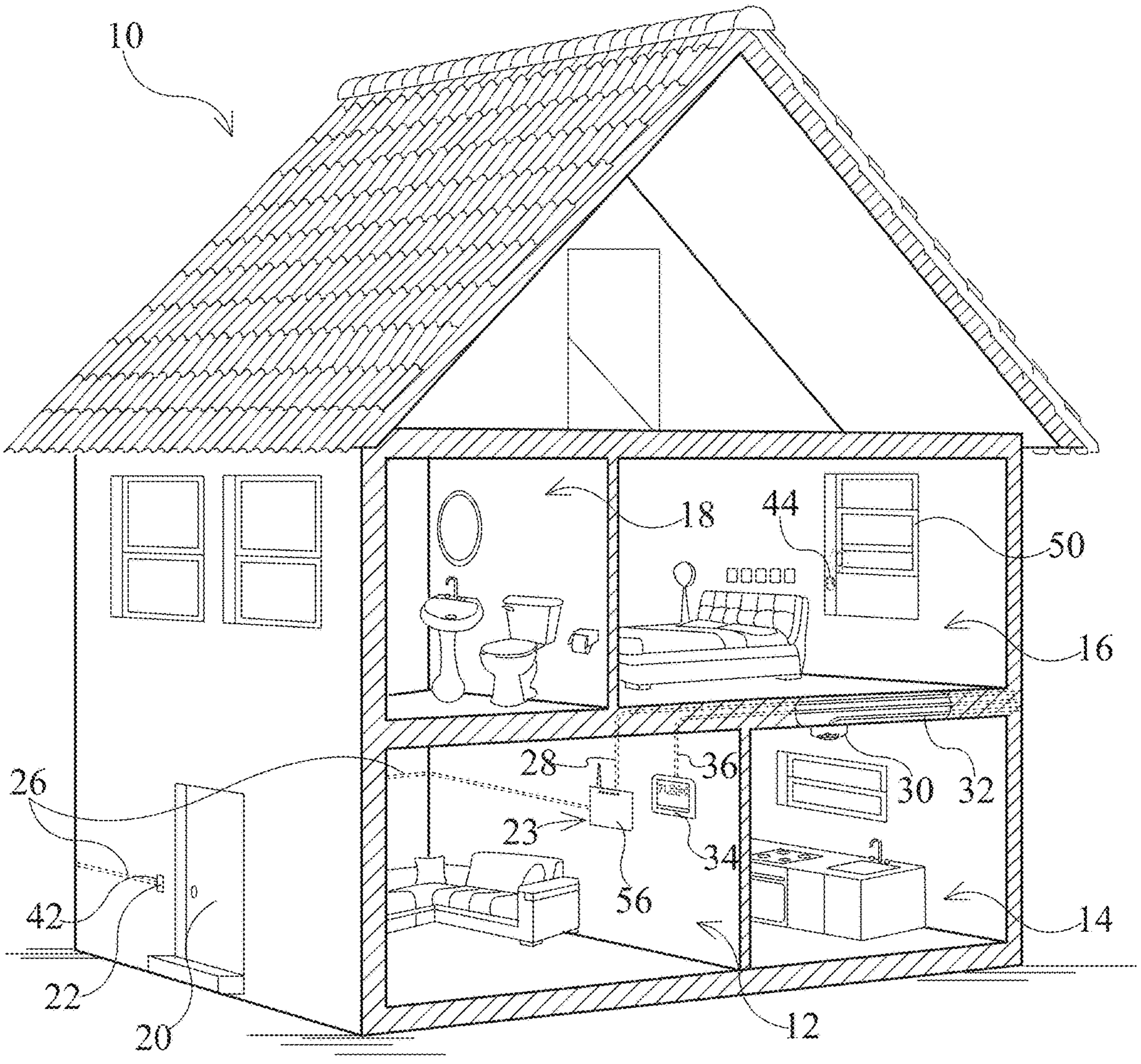
FIG. 5 is a perspective, partially exploded view of the house of FIG. 1 provided with a wireless access point installed according to a first method.

FIG. 5 is substantially similar to the system and method described for FIG. 2 with the exception that a receiver/transmitter, in this example a wireless access point 56 (e.g. Wi-Fi™ access point) replaces the doorbell chime 24 of FIG. 1 and couples to existing wiring 28 in this case.

Figure 6:
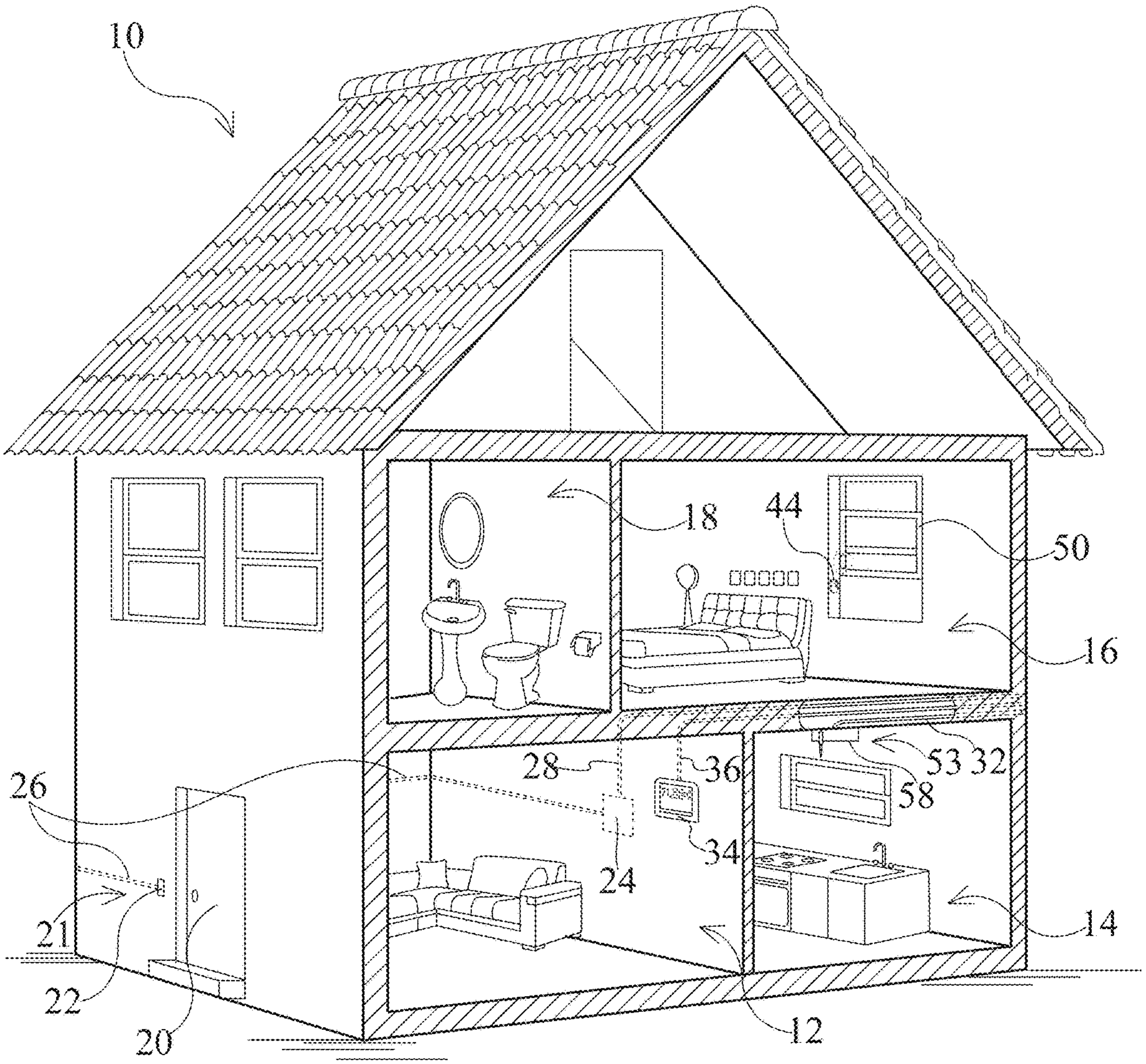
FIG. 6 is a perspective, partially exploded view of the house of FIG. 1 provided with a wireless access point installed according to a second method.

FIG. 6 is substantially similar to the system and method described for FIG. 3 with the exception that a receiver/transmitter, in this example a wireless access point 58 (e.g. Wi-Fi™ access point) replaces the smoke detector 30 of FIG. 1 and couples to existing wiring 32 in this case.

Figure 7:
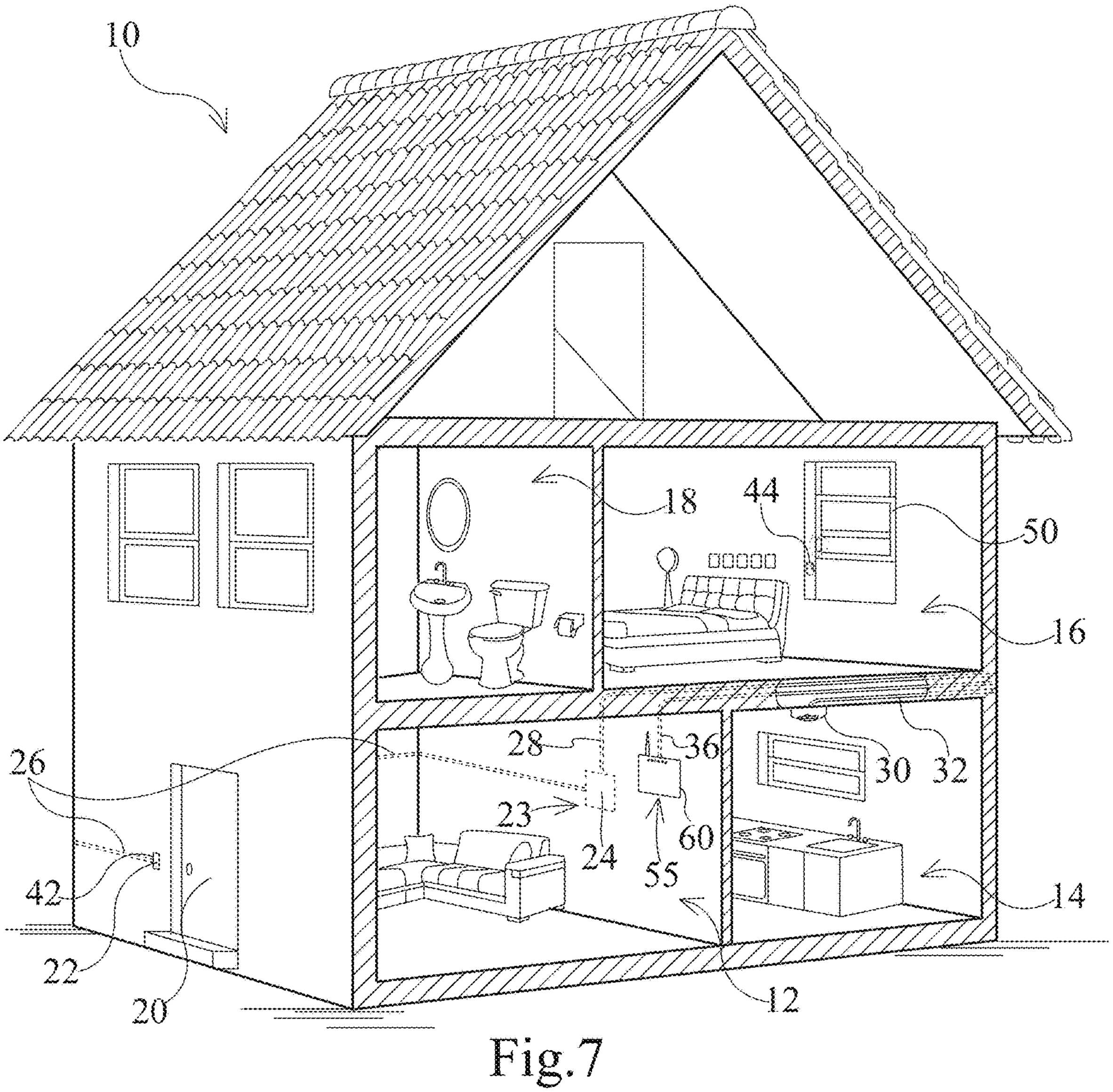
FIG. 7 is a perspective, partially exploded view of the house of FIG. 1 provided with a wireless access point installed according to a third method.

FIG. 7 is substantially similar to the system and method described for FIG. 4 with the exception that a receiver/transmitter, in this example a wireless access point 60 (e.g. Wi-Fi™ access point) replaces the thermostat 34 of FIG. 1 and couples to existing wiring 36 in this case.

ADDITIONAL DESCRIPTION

Examples of methods of installing security alarm systems, converting wired doorbell assembly into security alarm systems, and installing wireless access points have been described. The following clauses are offered as further description.

(1) A method of installing a security alarm system in a building having a doorbell and a doorbell chime, the method comprising: replacing the doorbell chime with a security control panel; connecting the security panel to the doorbell using existing wiring previously used to connect the doorbell chime to the doorbell.

(2) The method of clause 1 further including: installing a doorbell camera; and connecting the security panel to the doorbell camera using existing wiring previously used to connect the doorbell chime to the doorbell.

(3) A method of installing a security alarm system in a building having a doorbell chime, the method comprising replacing the doorbell chime with a security control panel or another component of a security alarm system.

(4) A method of installing a security alarm system in a building having a smoke detector, the method comprising replacing the smoke detector with a security control panel or another component of a security alarm system.

(5) A method of installing a security alarm system in a building having a carbon monoxide detector, the method comprising replacing the carbon monoxide detector with a security control panel or another component of a security alarm system.

(6) A method of installing a security alarm system in a building having a thermostat detector, the method comprising replacing the thermostat with a security control panel or another component of a security alarm system.

(7) A method of converting a wired doorbell assembly into a security alarm system for a building, the wired doorbell assembly including a doorbell chime installed in an existing location of the building and including a doorbell button, and the method comprising: disconnecting said doorbell chime from existing wiring thereof; removing from said existing location said doorbell chime; installing in said existing location a security control panel or other component of the security alarm system; connecting said security control panel or other said component of the security alarm system to said existing wiring so as to receive power therefrom; and providing said security control panel or other said component of the security alarm system with a speaker which broadcasts a chime when the doorbell button is pressed.

(8) The method of clause 7 further including: installing a doorbell camera; and connecting said security control panel or other said component of the security alarm system to the doorbell camera using said existing wiring.

(9) The method of clause 7 further including: providing said security control panel or other said component of the security alarm system with a battery to provide backup power to the security alarm system.

(10) The method of clause 8 further including: providing said security control panel or other said component of the security alarm system with a battery to provide backup power to the doorbell camera.

(11) The method of clause 8 further including: providing said security control panel or other said component of the security alarm system with a battery to protect the doorbell camera from power outages.

(12) A method of installing a security alarm system in a building having a doorbell button and a doorbell chime, the method comprising: replacing the doorbell chime with a security control panel or other component of the security alarm system; and connecting said security control panel or other said component of the security alarm system to the doorbell button using existing wiring previously used to connect the doorbell chime to the doorbell button.

(13) The method of clause 12 further including: installing a doorbell camera; and connecting said security control panel or other said component of the security alarm system to the doorbell camera using existing wiring previously used to connect the doorbell chime to the doorbell button.

(14) The method of clause 12 further including: providing said security control panel or other said component of the security alarm system with a battery to provide backup power to the doorbell camera.

(15) The method of clause 12 further including: providing said security control panel or other said component of the security alarm system with a battery to protect the doorbell camera from power outages.

(16) A method of installing a security alarm system in a building having one of a doorbell chime, a smoke detector, a carbon monoxide detector and a thermostat in an existing location, the method comprising: disconnecting said one of the doorbell chime, the smoke detector, the carbon monoxide detector and the thermostat from existing wiring thereof; removing from said existing location said one of the doorbell chime, the smoke detector, the carbon monoxide detector and the thermostat; installing in said existing location a security control panel or other component of the security alarm system; and connecting said existing wiring to said security control panel or other said component of the security alarm system so as to receive power therefrom.

(17) A method of installing a security alarm system in a building having at least one of a doorbell chime, a smoke detector, a carbon monoxide detector, and a thermostat, the method comprising replacing the at least one of the doorbell chime, the smoke detector, the carbon monoxide detector and the thermostat with a security control panel or another component of the security alarm system.

(18) A method of converting one of a doorbell chime, a smoke detector, a carbon monoxide detector and a thermostat in an existing location of a building to a wireless access point, the method comprising: disconnecting said one of the doorbell chime, the smoke detector, the carbon monoxide detector and the thermostat from existing wiring thereof; removing from said existing location said one of the doorbell chime, the smoke detector, the carbon monoxide detector and the thermostat; installing in said existing location the wireless access point; and connecting the wireless access point to said existing wiring so as to receive power therefrom.

(19) The method of clause 18 further including: selecting said one of the doorbell chime, the smoke detector, the carbon monoxide detector and the thermostat for removal from a centralized said location.

(20) A method of installing a wireless access point in a building having at least one of a doorbell chime, a smoke detector, a carbon monoxide detector, and a thermostat, the method comprising replacing the at least one of the doorbell chime, the smoke detector, the carbon monoxide detector, and the thermostat with the wireless access point.

(21) A method of installing a security alarm system so as to inhibit detection thereof, the method comprising: disconnecting one or more of a doorbell chime, a smoke detector, a carbon monoxide detector and a thermostat of a building from existing wiring thereof; removing from one or more existing locations thereof the one or more said doorbell chime, said smoke detector, said carbon monoxide detector and said thermostat; installing in said one or more existing locations one or more of a security control panel and other component of the security alarm system; and connecting said existing wiring to said one or more of said security control panel and other said component of the security alarm system so as to receive power therefrom.

It will also be understood by a person skilled in the art that many of the details provided above are by way of example only, and are not intended to limit the scope of the invention which is to be determined with reference to the following claims.

What is claimed is:

1. A method of installing a wireless access point so as to inhibit detection thereof within the interior of a building having an existing conventional doorbell chime and an exterior doorbell actuator coupled thereto via existing wiring, the method comprising:

disconnecting the doorbell chime of the building from the existing wiring, wherein the doorbell chime is in an existing location of the building which is central and elevated;

removing the doorbell chime from said existing location;

installing in said existing location the wireless access point; and hardwire connecting said existing wiring to said wireless access point so as to receive power therefrom.

2. The method as claimed in claim 1 further including: providing said wireless access point with a speaker which broadcasts a chime when the doorbell button is pressed.

3. The method as claimed in claim 1 further including: installing a doorbell camera; and connecting said wireless access point to the doorbell camera using said existing wiring.

4. The method as claimed in claim 1 further including: enabling said wireless access point to communicate wirelessly with a handheld device so as to provide thereto information regarding the status of the wireless access point.

5. The method of claim 1, wherein the existing location is spaced-apart and/or inwardly spaced from doors of the building.

6. The method of claim 1, wherein the existing location is spaced-apart and/or inwardly spaced from windows of the building.

7. The method of claim 1, wherein the existing location is positioned along or adjacent a central wall of the building.

8. The method of claim 1, wherein the existing location is positioned inwardly from outer sides of the building.

9. The method of claim 1, wherein the existing location is positioned along, adjacent or near a ceiling of a ground floor of the building.

10. A method of installing a wireless access point so as to inhibit detection thereof within the interior of a building, the method comprising:

disconnecting a smoke detector of the building from existing wiring thereof, wherein the smoke detector is in an existing location of the building which is central and elevated;

removing the smoke detector from said existing location;

installing in said existing location the wireless access point; and hardwire connecting said existing wiring to said wireless access point so as to receive power therefrom.

11. The method as claimed in claim 10 further including: enabling said wireless access point to communicate wirelessly with a handheld device so as to provide thereto information regarding the status of the wireless access point.

12. The method of claim 10, wherein the existing location is spaced-apart and/or inwardly spaced from doors of the building.

13. The method of claim 10, wherein the existing location is spaced-apart and/or inwardly spaced from windows of the building.

14. The method of claim 10, wherein the existing location is positioned along or adjacent a central wall of the building.

15. The method of claim 10, wherein the existing location is positioned inwardly from outer sides of the building.

16. The method of claim 10, wherein the existing location is positioned along, adjacent or near a ceiling of a ground floor of the building.

17. A method of installing a wireless access point so as to inhibit detection thereof within the interior of a building, the method comprising:

disconnecting a carbon monoxide detector of the building from existing wiring thereof, wherein the carbon monoxide detector is in an existing location of the building which is central and elevated;

removing the carbon monoxide detector from said existing location;

installing in said existing location the wireless access point; and hardwire connecting said existing wiring to said wireless access point so as to receive power therefrom.

18. The method as claimed in claim 17 further including: enabling said wireless access point to communicate wirelessly with a handheld device so as to provide thereto information regarding the status of the wireless access point.

19. The method of claim 17, wherein the existing location is spaced-apart and/or inwardly spaced from doors of the building.

20. The method of claim 17, wherein the existing location is spaced-apart and/or inwardly spaced from windows of the building.

21. The method of claim 17, wherein the existing location is positioned along or adjacent a central wall of the building.

22. The method of claim 17, wherein the existing location is positioned inwardly from outer sides of the building.

23. The method of claim 17, wherein the existing location is positioned along, adjacent or near a ceiling of a ground floor of the building.

* * * * *